Nov. 23, 1937. P. R. HASSON ET AL 2,099,886
HYDRAULIC HOIST
Filed Aug. 16, 1935 3 Sheets-Sheet 1

INVENTORS.
PAUL RUDOLPH HASSON.
NORMAN CHOATE STOREY.
BY
Percy Haddan
ATTORNEY

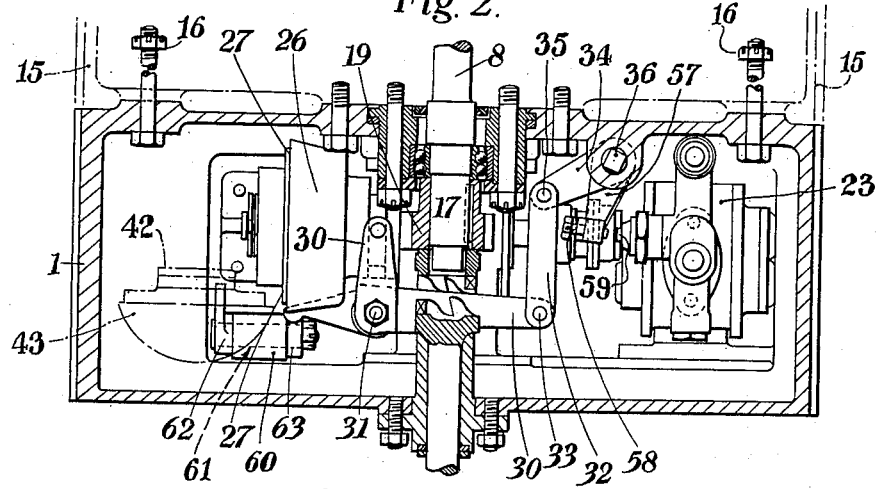
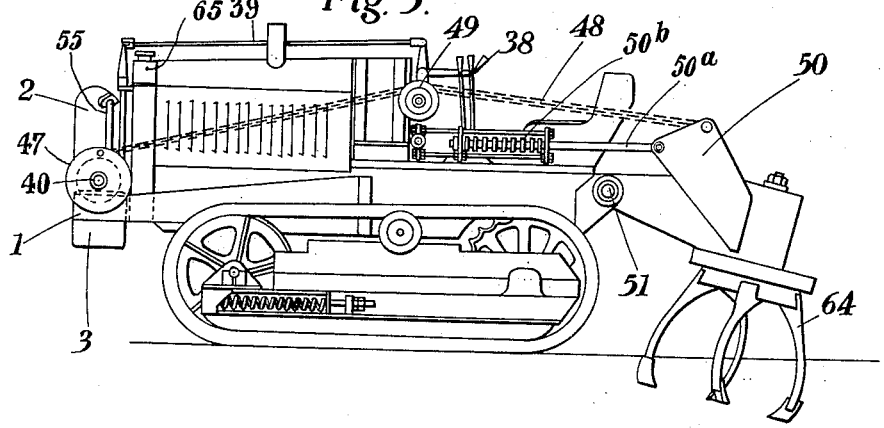
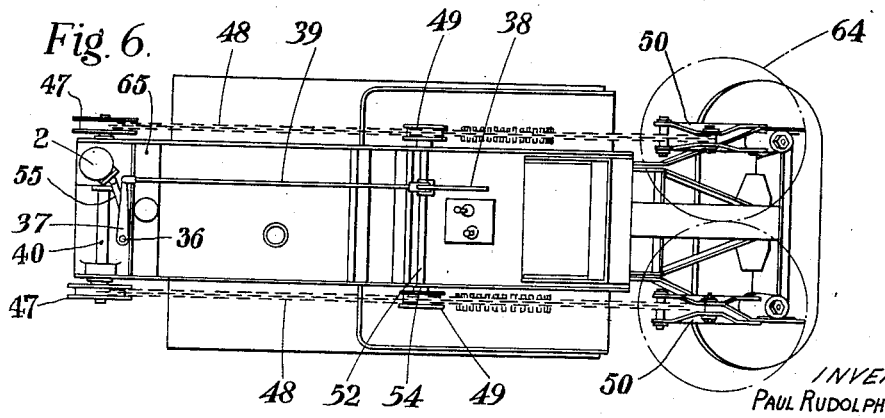

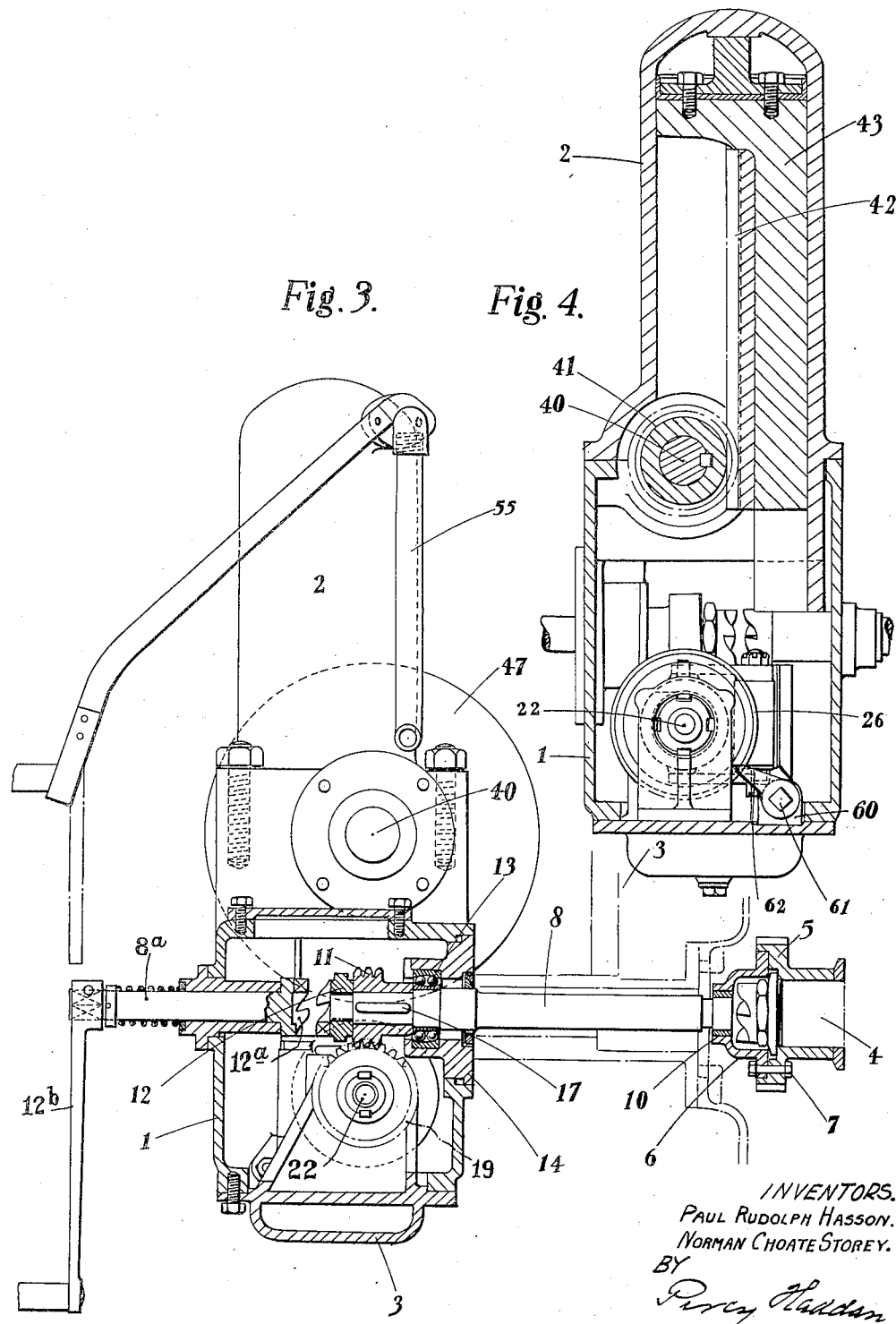

Patented Nov. 23, 1937

2,099,886

UNITED STATES PATENT OFFICE 2,099,886

HYDRAULIC HOIST

Paul Rudolph Hasson and Norman Choate Storey, Leeds, England

Application August 16, 1935, Serial No. 36,598

16 Claims. (Cl. 97—50)

This invention relates to hydraulic hoisting mechanism for soil working implements of motor driven tractors, and has for its object to provide improved mechanism set in action at will by the driver of the tractor whereby the soil working assembly of the tractor and thereby the tilling implements can be hoisted out of working contact with the soil or be lowered into the working position as may be required.

The annexed drawings illustrate an example of construction of the invention.

Fig. 2 is a section on line A—A of Fig. 1.

Fig. 3 is a section on line B—B of Fig. 1 seen in the direction of the arrows.

Fig. 4 is a section on line C—C of Fig. 1 seen in the direction of the arrows.

Fig. 5 is an elevation of a tractor showing the casing containing the hoisting mechanism attached to the forward end of the tractor.

Fig. 6 is a plan view of Fig. 5.

Figure 1:
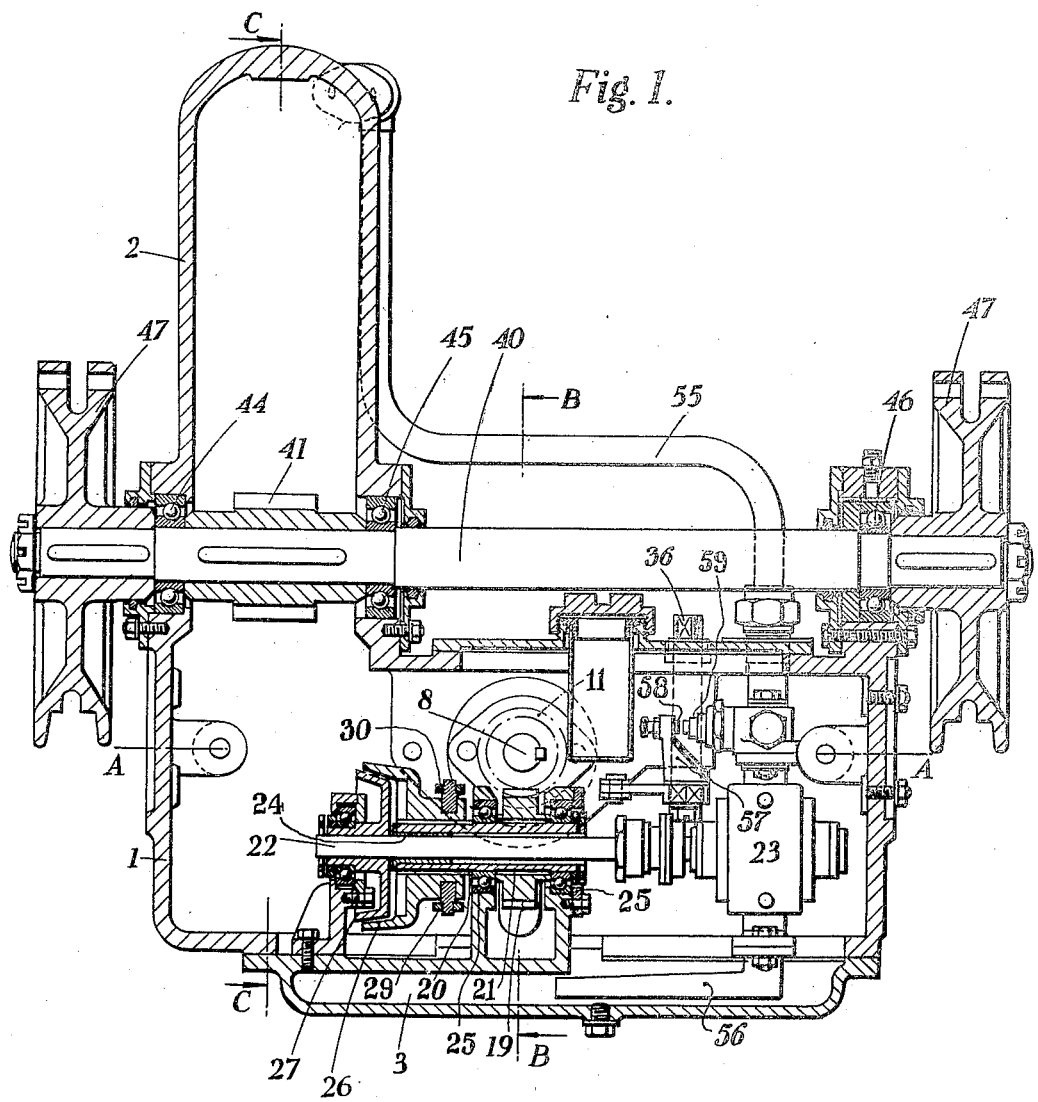
Fig. 1 is a vertical longitudinal section of the power transmitting mechanism and the casing therefor.

1 indicates the gear box or casing enclosing the power transmitting mechanism, this gearbox being fixed in any suitable manner at the forward end of the tractor as diagrammatically shown in Fig. 5. 2 indicates a vertical cylinder of the gear-box and 3 a base chamber of the gear-box. 4 is the forward end of the tractor's crankshaft, 5 is the tractor's timing gear which is fixed to the coupling ring 6 by bolts 7. The driving shaft 8 of the hoisting mechanism is driven from the tractor crankshaft 4 through the coupling ring 6 a part of which is the driving dental clutch 10 for driving said shaft 8 which is on the same axial centre line as the shaft 4. The shaft 8 is carried at its forward end in a ball bearing 13 and is there provided with a spiral pinion 11 keyed thereto by key 17 and with a clutch member 12 fixed on its forward end.

Opposite the clutch member 12 is the other member 12a of this clutch fixed to the shaft 8a of the starting handle 12b of the tractor motor.

The gear case 1 which encloses the power transmitting mechanism of the hoist is held central with the shaft 8 by fitting over housing 14 which acts as a spigot, this gear case 1 being supported and carried directly in front of the tractor's radiator 65 (Fig. 5) by side plates 15 and bolts 16 (Fig. 2). The spiral pinion 11 keyed to the driving shaft 8 drives a spiral wheel 19 keyed to clutch sleeve 20 by key 21. The clutch sleeve 20 is rotarily mounted on the driving shaft 22 of the oil pump 23 by bush 24 and is supported in the gear case by ball bearings 25. On the splined end of the clutch sleeve 20 is mounted the female portion 26 of a clutch which female portion can be moved through clutch operating gear hereafter described to engage with the male portion 27 of the clutch which is keyed solid to the pump driving shaft 22. The operating gear for engaging or disengaging the clutch consists of a clutch strap 28 which is made in halves and bolted together to facilitate fitting to the female portion 26 of the clutch. To the bottom half of the clutch strap 28 is fitted a lever 29 and to the top half a lever 30. Both levers 29 and 30 are fixed to spindle 31. Lever 30 is in the form of a bell crank, one crank being fixed to the clutch strap and the other crank to connecting link 32 by joint pin 33. Connecting link 32 is coupled to the operating lever 34 by joint pin 35 the other end of the operating lever fitting over the lower end of the operating spindle 36. On to the upper end of spindle 36 is fixed operating lever 37 Fig. 6 which is connected to the hand operating lever 38 by rod 39. The hoist shaft 40 (Fig. 1) on to which is keyed the pinion 41 engaging with the rack 42 Fig. 4 secured to the piston block 43, is carried in bearings 44, 45 and 46, and has hoisting chain drums 47 keyed on to its ends. Connected to and arranged to wind on to the chain drums 47 are hoisting chains 48 (Figs. 5 and 6) passing over pulleys 49 and connected by the frames 50 provided with rods 50a slidable against spring buffers 50b to the tilling implement assembly 64 which is hinged to the rear of the tractor at 51. The pulleys 49 are carried on a shaft 52 mounted in bearings 53 and 54. Mounted on the front of the tractor is the gear-box 1, with its cylinder 2 containing the hydraulic piston block 43. Leading to the top of the cylinder 2 is a pipe 55 which carries the oil or other liquid delivered by a pump 23 to the hydraulic cylinder. Connected to the suction side of the pump 23 is suction pipe 56 the open end of which is immersed in the oil contained in the gearbox base 3. Fixed to the lower end of operating spindle 36 is a lever 57 in the end of which is fixed a set screw 58 so as to engage with the release valve 59 when the hand operating lever 38 is moved to the lower position. The oil in the cylinder 2 is then returned to the gearbox through the release valve 59 as the piston block 43 returns to the top of the cylinder. Fitted into bracket 60 cast integral with the gear box base 3 is spindle 61 on the ends of which is fixed knock off levers 62 and 63. When the piston 43 is almost at the bottom of its stroke it strikes lever 62 and actuates lever 63 through spindle 61. Lever 63 is then moved to such a position as to push lever 29 and thus throw the clutch out of action when the implements have been hoisted to the proper height.

It is now obvious that while the motor is running, the clutch sleeve 20 is also in motion being driven through shaft 8 and gears 11 and 19. When it is desired to lift the implements 64 at the rear of the tractor, the hand lever 38 is raised and thus through intermediate levers and connections the shifter lever yoke 29 is moved thereby bringing the rotating female clutch member 26 into contact with the stationary male clutch member 27. The clutch member 27 being keyed to the pump shaft 22 drives this shaft and thus oil is drawn from the gearbox base 3 through pipe 56 to the pump 23, and from the pump is delivered through pipe 55 into cylinder 2 and on to the head of the piston 43. The pressure of the oil forces the piston 43 down the cylinder 2 and the toothed rack 42 rotates the hoisting drums 47 through pinion 41 and shaft 40. To lower the implements, the hand lever 38 is pushed downwards which action moves the set screw 58 into contact with the release valve 59, as previously explained, the pressure in the cylinder is thus released and the oil is returned to the gearbox through pipe 55 and valve 59.

The gearbox 1 which houses the clutch and gearing is partly filled with oil so that all important rapidly moving parts work in a bath of oil.

What we claim as our invention and desire to secure by Letters Patent of the United States is:—

1. In a motor driven tractor, a soil working implement assembly adapted to be raised and lowered, arranged at the rear end thereof, a rotary member, means connecting said assembly to said member for lifting said assembly upon rotation of said member, hydraulic mechanism including a piston-driven rack and a pinion on the rotary member for rotating said member, a clutch-controlled pump for setting said hydraulic mechanism in action from the motor of the tractor to raise said assembly, when required, and means for lowering said assembly through said hydraulic mechanism when required.

2. In a motor driven tractor, a soil working implement assembly adapted to be raised and lowered, arranged at the rear end thereof, a casing, means for supporting said casing at the forward end of the tractor, hydraulic mechanism within said casing, means for setting in action said hydraulic mechanism from the front end of the motor of the tractor, rotary hoisting means connected to said assembly, means operated by said hydraulic mechanism for rotating said hoisting means, and means for lowering said assembly through said hydraulic mechanism and said hoisting means.

3. In a motor driven tractor, a soil working implement assembly adapted to be raised and lowered, arranged at the rear end thereof, a clutch-controlled pump, means for supplying liquid thereto, means for driving said pump, a cylinder, a hydraulic piston within said cylinder, means for the delivery of liquid from said pump to said cylinder to operate said piston, a rotary drum, means connected to said assembly and adapted to be wound on said drum, a rack actuated by said piston, a pinion driven by said rack for rotating said drum to raise said assembly, and means for promoting the return of the liquid from said cylinder to said pump and thereby a reverse movement of said piston to lower said assembly.

4. In a motor driven tractor, a soil working implement assembly adapted to be raised and lowered, arranged at the rear end thereof, a clutch-controlled pump, means for supplying liquid thereto, means for driving said pump, a cylinder, a hydraulic piston within said cylinder, means for the delivery of liquid from said pump to said cylinder to operate said piston, rotary hoisting means connected to said assembly, a rack actuated by said piston, a pinion driven by said rack for rotating said hoisting means to raise said assembly, means for promoting the return of the liquid from said cylinder to said pump and thereby a reverse movement of said piston to lower said assembly, and means operated by said piston for cutting out the action of said pump and thereby the delivery of the liquid therefrom to said cylinder when said assembly has been raised to the required height.

5. In a motor driven tractor, a soil working implement assembly adapted to be raised and lowered, arranged at the rear end thereof, a shaft, means for driving said shaft from the tractor driving motor, a pinion on said shaft, a pump having a driving spindle, a gear on said spindle meshing with said pinion, a clutch sleeve rotarily mounted on the driving spindle of said pump, one member of a clutch mounted on said sleeve, another member of said clutch mounted on said pump driving spindle, means for operating said clutch members to govern the action of said pump, a cylinder, a hydraulic piston therein actuated through said pump, hoisting means for said assembly, and means for actuating said hoisting means by said piston.

6. In a motor driven tractor, a soil working implement assembly adapted to be raised and lowered, arranged at the rear end thereof, a casing, means for supporting said casing at the forward end of the tractor, hydraulic mechanism within said casing, means for setting in action said hydraulic mechanism from the front end of the motor of the tractor, a cross-shaft mounted on said casing, means for actuating said cross-shaft by said hydraulic mechanism, a drum on each end of said cross-shaft, chains connected to said drums and to said assembly, and guiding pulleys mounted on the tractor for said chains.

7. In a motor driven tractor, a soil working implement assembly adapted to be raised and lowered, arranged at the rear end thereof, a clutch-controlled pump, means for supplying liquid thereto, means for driving said pump, a cylinder, a hydraulic piston within said cylinder, means for the delivery of liquid from said pump to said cylinder to operate said piston, a rack carried by said piston, a cross-shaft, a pinion on said cross-shaft gearing with said rack, a drum on each end of said cross-shaft, chains connected to said drums and to said assembly, guiding pulleys mounted on the tractor for said chains, and means operated by said piston for cutting out the action of said pump and thereby the delivery of the liquid therefrom to said cylinder when said cross-shaft and said drums thereon have been rotated by said rack and said pinion to raise said assembly by said chains to the required height.

8. A hydraulic hoist comprising a rotating drum shaft, a gear mounted on said shaft, a hydraulic cylinder, a slidable piston fitted in said cylinder, a toothed rack mounted on said slidable piston and meshing with said gear, and means comprising a clutch-controlled oil pump to actuate said piston.

9. In a motor driven tractor, a soil working implement assembly adapted to be raised and lowered, arranged at the rear end thereof, hydraulic mechanism for hoisting said assembly, a pump for supplying liquid to said hydraulic mechanism, and a clutch operable at will for coupling said pump to the tractor motor to control the actuation of said hydraulic mechanism.

10. In a motor driven tractor, a soil working implement assembly adapted to be raised and lowered, arranged at the rear end thereof, a rotary member, means connecting said assembly to said member for lifting said assembly upon rotation of said member, hydraulic mechanism for rotating said member, a pump for supplying liquid to said hydraulic mechanism, and a clutch operable at will for coupling said pump to the tractor motor to control the actuation of said hydraulic mechanism.

11. A hoisting attachment for motor-driven vehicles, comprising a casing, a hoisting drum carried by said casing, a hydraulic cylinder, a piston in said cylinder, means actuated by said piston for rotating said drum, a pump for supplying liquid under pressure to said cylinder, a shaft in said casing driven by the motor of the vehicle, and a clutch for coupling said pump to said shaft at will to actuate said drum.

12. A hoisting attachment for motor-driven vehicles, comprising a casing, a hoisting drum carried by said casing, a hydraulic cylinder, a piston in said cylinder, means actuated by said piston for rotating said drum, a pump for supplying liquid under pressure to said cylinder, a shaft in said casing driven by the motor of the vehicle, a clutch for coupling said pump to said shaft at will to actuate said drum, means for operating said clutch, and a relief valve operable by the clutch-operating means for discharging liquid from the cylinder.

13. A hydraulic hoist comprising a rotatably mounted hoisting shaft, a hydraulic plunger, a rack and gear for transmitting reciprocatory motion from said plunger into rotary motion of said shaft, a manually-controlled liquid pressure pump for controlling the hoisting movements of the hydraulic plunger, and means comprising a manually operated release valve for controlling the lowering movement of the hydraulic plunger.

14. A hydraulic implement hoist comprising rotatable winding drums, a hydraulic plunger, a rack and gear for transmitting reciprocatory motion of said plunger into rotary motion of said drums, said hoist being so constructed that the reaction of a hoisted implement on the winding drums will drive the hoisting plunger to a lowered position.

15. A hydraulic implement hoist comprising rotatable winding drums, a hydraulic plunger, a rack and gear for transmitting reciprocatory motion of said plunger into rotary motion of said drums, a manually-controlled pressure pump for driving the plunger to a hoisted position, and a manually-controlled release valve operable to release the pressure on the plunger and to allow the force from the weight of the lifted implements on the periphery of the drums to drive the plunger to its lowered position.

16. In combination with a tractor having a motor, a change speed transmission and a master clutch between the motor and transmission, a hydraulic implement hoist comprising a hydraulic plunger, a rotatably mounted hoisting shaft, a rack and gear driving connection between the plunger and shaft, hoisting means driven by the rotatably mounted shaft whereby the force of gravity on the hoisted implements is continually available for driving the hoisting mechanism to a lowered position, a direct continuous driving connection through a shaft to the forward end of the tractor's motor, a pressure pump for driving the hydraulic plunger, means comprising a manually operated clutch for controlling the hoisting movements of the hydraulic plunger, and means comprising a manually operated release valve for controlling the lowering movements of the hydraulic plunger.

PAUL RUDOLPH HASSON.
NORMAN CHOATE STOREY.